United States Patent
Frison

(10) Patent No.: US 10,455,298 B2
(45) Date of Patent: Oct. 22, 2019

(54) SYSTEMS AND METHODS OF FAST WIRELESS OUTPUT DEVICE ACTIVATION IN A MESH NETWORK SYSTEM

(71) Applicant: Honeywell International Inc., Morristown, NJ (US)

(72) Inventor: Andrea Frison, Monfalcone (IT)

(73) Assignee: Honeywell International Inc., Morris Plains, NJ (US)

( * ) Notice: Subject to any disclaimer, the term of this patent is extended or adjusted under 35 U.S.C. 154(b) by 144 days.

(21) Appl. No.: 13/645,766

(22) Filed: Oct. 5, 2012

(65) Prior Publication Data

US 2014/0098802 A1 Apr. 10, 2014

(51) Int. Cl.
*H04W 4/00* (2018.01)
*H04Q 9/00* (2006.01)

(52) U.S. Cl.
CPC ......... *H04Q 9/00* (2013.01); *H04Q 2209/823* (2013.01)

(58) Field of Classification Search
CPC ..................................................... H04L 67/28
USPC ......................................... 370/338, 256, 351
See application file for complete search history.

(56) References Cited

U.S. PATENT DOCUMENTS

| | | | | |
|---|---|---|---|---|
| 4,796,025 A * | 1/1989 | Farley | ...................... | H04Q 9/14 340/3.4 |
| 6,150,936 A * | 11/2000 | Addy | ...................... | G08B 25/10 340/506 |
| 6,452,908 B1 * | 9/2002 | Yamada et al. | ............... | 370/256 |
| 7,146,452 B2 * | 12/2006 | Brocco et al. | ................ | 710/312 |
| 8,457,013 B2 * | 6/2013 | Essinger et al. | .............. | 370/254 |
| 8,902,740 B2 * | 12/2014 | Hicks, III | ............ | G08B 25/004 370/229 |
| 2004/0145465 A1 * | 7/2004 | Stults | ....................... | G08B 1/08 340/521 |
| 2005/0099299 A1 * | 5/2005 | Tyroler et al. | ............. | 340/572.1 |
| 2005/0246475 A1 * | 11/2005 | Ervin | ............................ | 710/306 |
| 2007/0170663 A1 * | 7/2007 | Kuipers et al. | ............... | 277/645 |
| 2008/0232347 A1 * | 9/2008 | Chao et al. | ................... | 370/351 |

(Continued)

FOREIGN PATENT DOCUMENTS

| | | |
|---|---|---|
| EP | 2 120 225 A2 | 11/2009 |
| EP | 2 469 493 A1 | 6/2012 |
| WO | WO 2008/048933 A2 | 4/2008 |

OTHER PUBLICATIONS

European Search Report, corresponding to Application No. EP 13 18 5246, dated Jan. 10, 2014.

(Continued)

*Primary Examiner* — Mohammad S Anwar
*Assistant Examiner* — Angel Brockman
(74) *Attorney, Agent, or Firm* — Brooks, Cameron & Huebsch, PLLC

(57) ABSTRACT

Systems and methods of fast wireless output device activation in a mesh network system are provided. Methods can include a parent device receiving data from a child device, the parent device determining if the data received from the child device requires an output, and if so, the parent device activating an output device associated with the parent device. In some methods, the parent device need not wait for instructions from a control panel or gateway before activating the output device. Accordingly, the latency time to activate the output device can be reduced.

13 Claims, 4 Drawing Sheets

(56) References Cited

U.S. PATENT DOCUMENTS

2010/0280836 A1* 11/2010 Lu .................... G08B 27/001
                                                    705/1.1
2012/0238319 A1*  9/2012 Lake .................. G08B 7/06
                                                    455/556.1
2013/0106600 A1*  5/2013 Hall .................. G08B 29/12
                                                    340/514

OTHER PUBLICATIONS

Communication Pursuant to Article 94(3) EPC from related European Application No. 13185246, dated Oct. 17, 2018, 5 pages.
Examination report for corresponding EP patent application 13185246.9, dated Jan. 30, 2017.

* cited by examiner

SYSTEMS AND METHODS OF FAST WIRELESS OUTPUT DEVICE ACTIVATION IN A MESH NETWORK SYSTEM

FIELD

The present invention relates generally to a mesh network system. More particularly, the present invention relates to systems and methods of fast wireless output device activation in a mesh network system.

BACKGROUND

Communication in a fire detection system is rare unless a pre-fire or fire scenario is occurring. For example, when devices in a fire detection system are sensing alarming levels of heat or smoke, all input devices in the system can transmit alarms and/or data to a gateway. Often, these transmissions can be substantially simultaneous. Accordingly, a cascading wave communication protocol can support communication in these types of worst-case scenarios.

A cascading wave communication protocol works on the principal of data aggregation. For example, a wireless fire detection system can include four sensors S1, S2, S3, and S4. As seen in FIG. 1, a packet transmitted by sensor S4 includes only S4's data. When the packet is received by sensor S3, sensor S3 appends its data to S4's data and transmits the packet to sensor S2. When the packet reaches a panel P, the packet can include data from all four sensors S1, S2, S3, and S4.

A large wireless fire system loop can include any number of devices, for example, N devices. In these systems, the cascading wave communication protocol can support a packet size large enough to aggregate data from all N devices. For example, each communication time slot can be long enough to accommodate a maximum size packet.

To enable efficient data aggregation without increasing message latency, child nodes can be allocated communication time slots before the parent nodes. In FIG. 1, sensor S3 can be a router or parent of sensor S4, sensor S2 can be a parent of sensor S3, and so on. The communication time slots allocated to sensors S4, S3, S2, and S1 can be slot 1, slot 2, slot 3, and slot 4, respectively. Accordingly, a child node's data can always be available at the parent node during the parent node's communication time slot. In this manner, the parent node can aggregate its own data with the data received from its child node. Then, the parent node can transmit the aggregated data together in a single packet.

In some systems, a parent node can have multiple child nodes. However, the communication time slots of all child nodes can occur before the communication time slot of the parent node. Accordingly, a packet transmitted by a parent can contain its own data aggregated with the data or alarms received from all of its child nodes.

Due to the aggregation described above, the transmission of data from four nodes requires four communication time slots. Similarly, the transmission of data from N nodes requires N transmission time slots. In this manner, a control panel can receive data from each of the nodes in the network.

Using the same protocol described above, a control panel can also transmit data to nodes in a network. For example, a fire panel can transmit data to N nodes in a network, and the data can reach each of the N nodes in respective ones of N time slots. When the control panel transmits data to nodes, the slot allocation of the nodes can be reversed.

When a device in a wireless system detects an alarm, the device can transmit data to a gateway. The gateway can be polled by a control panel in a wired system, which, depending on the content of the received data, can activate various output devices. When one of the output devices to be activated is part of the wireless system, the control panel can transmit instructions to the gateway, which can re-transmit the instructions to the output device. In these circumstances, the latency time to activate the output device in the wireless system can be the sum of the time for the gateway to receive data from a device, the time for the gateway to transmit data to the control panel, the time for the gateway to receive instructions from the control panel, and the time for the gateway to transmit the instructions to an output device. That is:

$$T_{tot}=T_{input\_gw}+T_{gw\_panel}+T_{panel\_gw}+T_{gw\_output} \quad (1)$$

In various situations, the length of this latency time can be problematic. Accordingly, there is a continuing, ongoing need for systems and methods of fast wireless output device activation in a mesh network system.

DETAILED DESCRIPTION

Figure 1:
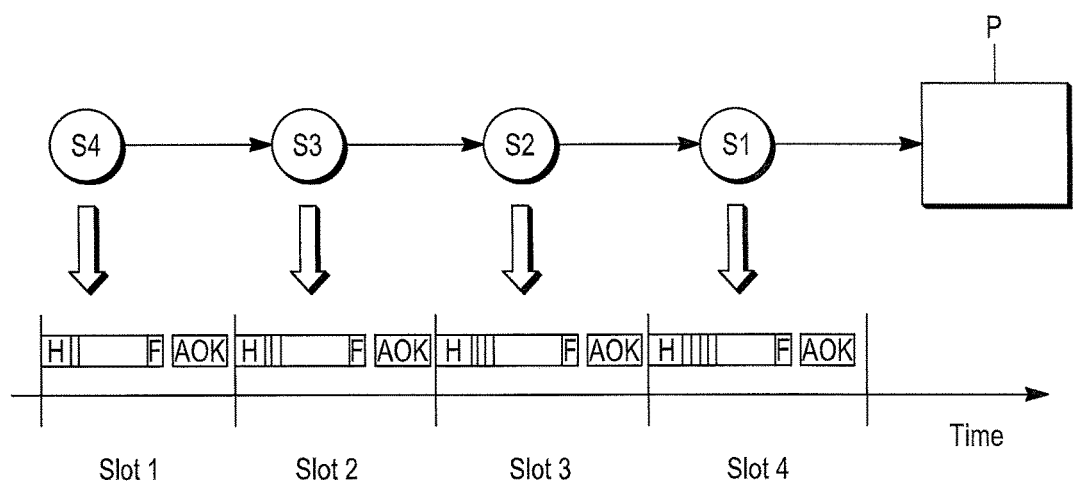
FIG. 1 is a block diagram of time-slotted communication using a cascading wave communication protocol.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of fast wireless output device activation in a mesh network system.

In some embodiments, the status of a child device can be made available to a parent device substantially immediately. Accordingly, a mesh network can be organized in such a way that the output to be activated by a certain input is a parent of that input. When arranged in this manner, an output can be activated without waiting for a command from a control panel.

Figure 2:
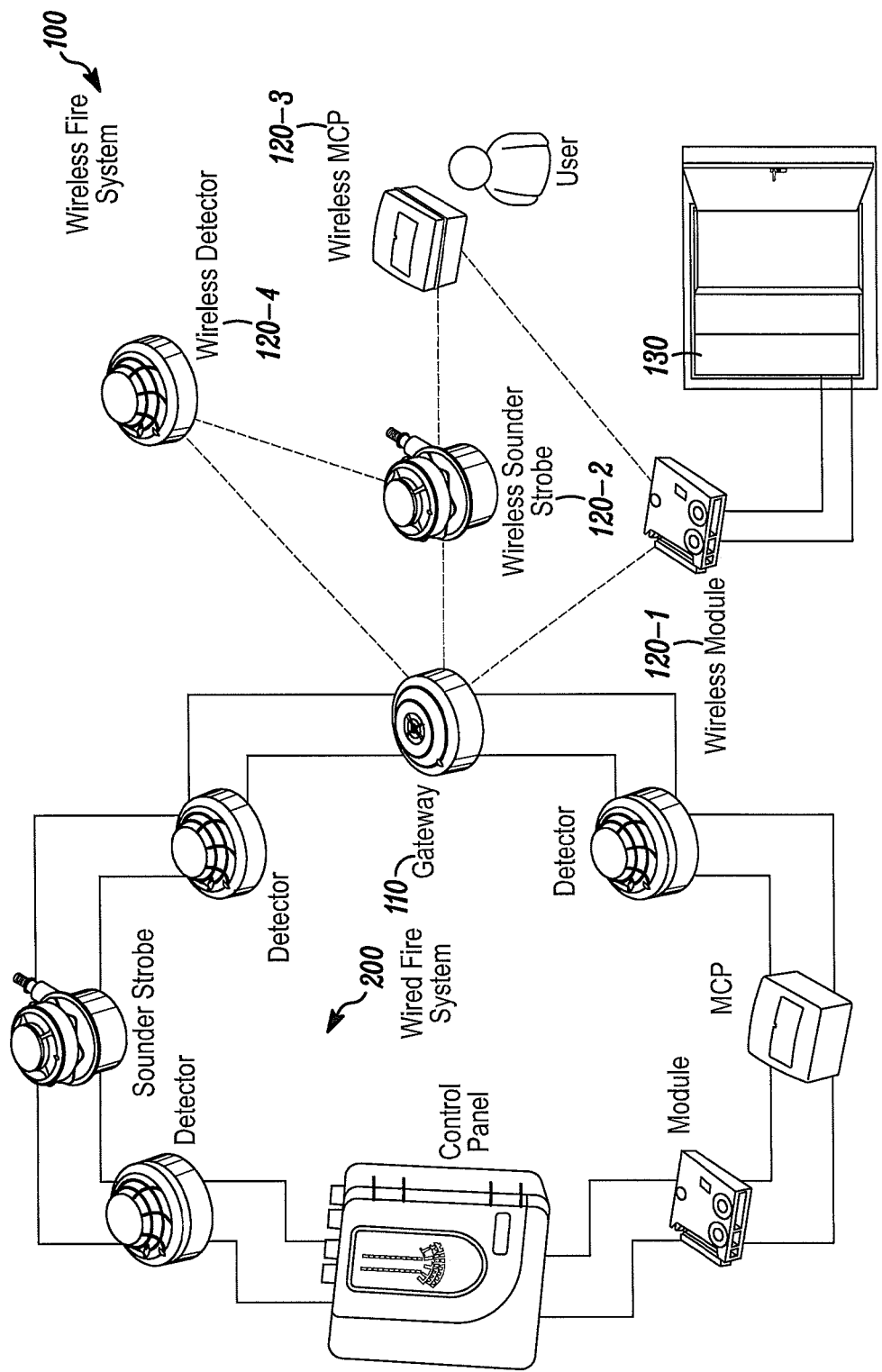
FIG. 2 is a block diagram of a wireless fire detection system connected to a wired fire detection system via a gateway.

FIG. 2 is a diagram of a wireless fire detection system 100 connected to a wired fire detection system 200 via a gateway 110. As seen in FIG. 1, the wireless system 100 can include four devices or nodes: a wireless output module 120-1, a wireless sounder strobe 120-2, a wireless call point 120-3, and a wireless detector 120-4. The call point 120-3 can be the child of both the sounder strobe 120-2 and the output module 120-1. The output module 120-2 can control an electromagnet to close a fire door 130.

In some embodiment, the sounder strobe 120-2 and the output module 120-1 can check messages coming from the call point 120-3. When either the sounder strobe 120-2 or the output module 120-1 receives a message from the call point 120-3 that indicates an alarm condition, the sounder strobe 120-2 and/or the output module 120-1 can activate itself to emit an output. For example, the sounder strobe can emit a sounding siren or strobe a light. Similarly, the output module 120-1 can cause the electromagnet to close the fire door 130.

In accordance with disclosed embodiments, the sounder strobe 120-2 and the output module 120-1 need not wait for a command transmitted by the control panel 210 via the gateway 110. Accordingly, the latency time to activate an output device in the wireless system can be reduced as compared to systems and methods known in the art.

Figure 3:
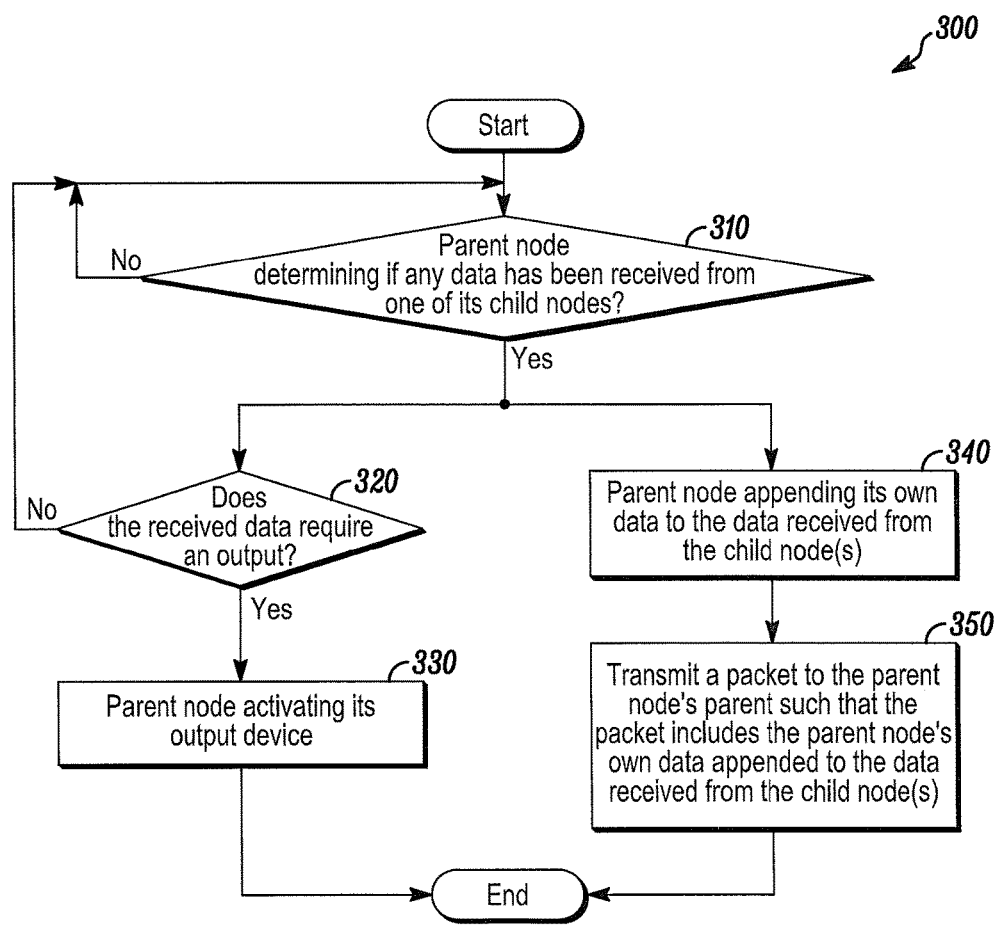
FIG. 3 is a flow diagram of a method in accordance with disclosed embodiments.

FIG. 3 is a flow diagram of a method 300 in accordance with disclosed embodiments. As seen in FIG. 3, the method 300 can include a parent node determining if any data has been received from one of its child nodes as in 310. For example, the parent node can include an output device, and the child node can include an input device. Both the parent node and the child node can be part of a wireless system.

If the method 300 determines that the parent node has not received data from any of its child nodes as in 310, then the method 300 can continue determining if the parent node has received any data from one of its child nodes as in 310. However, if the method 300 determines that the parent node has received data from one of its child nodes as in 310, then the method 300 can include the parent node determining if the received data requires an output as in 320.

If the method 300 determines that the received data does not require an output as in 320, then the method 300 can continue determining if the parent node has received any data from one of its child nodes as in 310. However, if the method 300 determines that the received data requires an output as in 320, then the method 300 can include the parent node activating its own output device as in 330.

After the method 300 determines that the parent node has received data from one of its child nodes as in 310, the method 300 can also include the parent node appending its own data to the data received from the child node(s) as in 340. Then, the parent node can transmit a packet to the parent node's parent as in 350. For example, the packet transmitted by the parent node can include the data from the parent node appended to the data received from the child node(s). In some embodiments, the parent node's parent can include a gateway.

In some embodiments, the parent node determining if the received data requires an output as in 320 and the parent node activating its output device as in 330 can occur substantially simultaneously with the parent node appending its data to data received from a child node as in 340 and the parent node transmitting a packet to the parent node's parent as in 350. Accordingly, in some embodiments, the parent node need not wait for instructions from the parent node's parent before activating its output device. That is, the parent node can activate its own output device prior to receiving instructions from a control panel or gateway.

Figure 4:
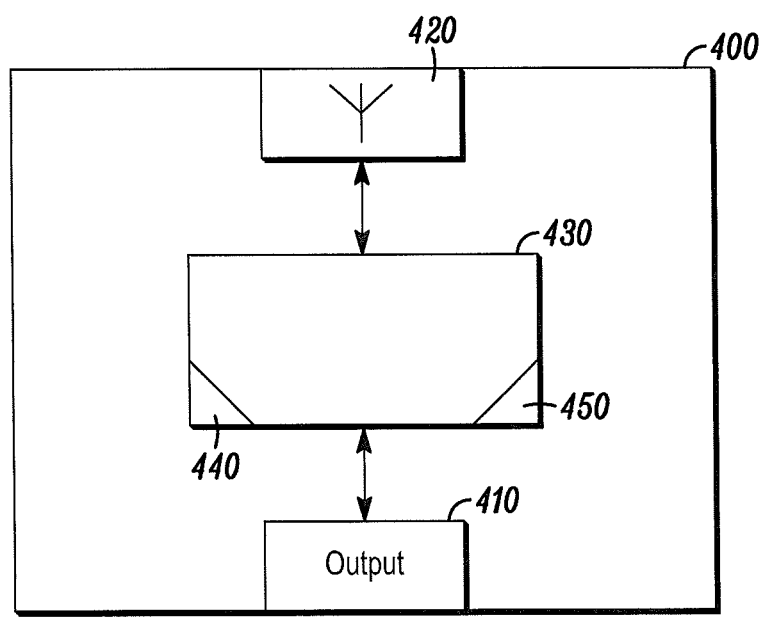
FIG. 4 is a block diagram of a wireless device in accordance with disclosed embodiments.

The method 300 of FIG. 3 and others in accordance with disclosed embodiments can be executed by the wireless device 400 shown in FIG. 4. For example, the wireless device 400 can be part of the wireless fire detection system 100 shown in FIG. 1.

As seen in FIG. 4, the wireless device 400 can include an output device 410, a transceiver 420, control circuitry 430, one or more programmable processors 440, and executable control software 450. The executable control software 450 can be stored on a transitory or non-transitory computer readable medium, including but not limited to, computer memory, RAM, optical storage media, magnetic storage media, flash memory, and the like. In some embodiments, the programmable processor 440 and the executable control software 450 can execute at least some steps of the method 300 shown in FIG. 3 as well as others described herein.

For example, the programmable processor 440 and the executable control software 450 can use the transceiver 420 to determine if any data has been received from a child node of the wireless device 400. The programmable processor 440 and the executable control software 450 can also determine if any received data requires an output. If so, then the programmable processor 440 and the executable control software 450 can activate the output device 410.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
   providing a parent device that includes a siren device that emits a siren, a strobe device that emits a strobe light, or an electromagnet that closes or opens a fire door;
   the parent device wirelessly receiving child device data from a child device;
   the parent device appending parent device data to the child device data;
   the parent device wirelessly transmitting a packet to a control panel when the parent device receives the child device data from the child device, wherein the packet includes the parent device data appended to the child device data;
   the parent device determining whether the child device data indicates an alarm condition; and
   when the child device data indicates the alarm condition, the parent device activating the siren device, the strobe device, or the electromagnet without waiting for a command from the control panel,
   wherein the parent device activates the siren device, the strobe device, or the electromagnet substantially simultaneously with the parent device transmitting the child device data and the parent device data to the control panel, and
   wherein the parent device, the child device, and the control panel are distinct devices.

2. The method of claim 1 further comprising, responsive to transmitting the packet to the control panel, wirelessly receiving instructions from the control panel via a gateway.

3. The method of claim 2 further comprising activating the siren device, the strobe device, or the electromagnet prior to wirelessly receiving the instructions from the control panel via the gateway.

4. The method of claim 1 further comprising activating the siren device, the strobe device, or the electromagnet substantially immediately after wirelessly receiving the child device data from the child device and determining that the child device data indicates the alarm condition.

5. A parent wireless device comprising:
a transceiver,
an alarm device, wherein the alarm device includes a siren device that emits a siren, a strobe device that emits a strobe light, or an electromagnet that closes or opens a fire door;
a programmable processor; and
executable control software stored on a non-transitory computer readable medium,
wherein the transceiver wirelessly receives child device data from a child device in the ambient condition detection system,
wherein the programmable processor and the executable control software append parent device data to the child device data;
wherein the transceiver wirelessly transmits a packet to a control panel when the transceiver receives the child device data from the child device, wherein the packet includes the parent device data appended to the child device data,
wherein the programmable processor and the executable control software determine whether the child device indicates an alarm condition,
wherein, when the child device data indicates the alarm condition, the programmable processor and the executable control software activate the siren device, the strobe device, or the electromagnet without waiting for a command from the control panel,
wherein the programmable processor and the executable control software activate the siren device, the strobe device, or the electromagnet substantially simultaneously with the transceiver transmitting the child device data to the control panel, and
wherein the parent wireless device, the child device, and the control panel are distinct devices.

6. The parent wireless device of claim 5 wherein, responsive to transmitting the packet, the transceiver wirelessly receives instructions from the control panel via a gateway.

7. The parent wireless device of claim 6 wherein the programmable processor and the executable control software activate the siren device, the strobe device, or the electromagnet prior to the transceiver wirelessly receiving the instructions from the control panel via the gateway.

8. The parent wireless device of claim 5 wherein the programmable processor and the executable control software activate the siren device, the strobe device, or the electromagnet substantially immediately after the transceiver wirelessly receives the child device data from the child device and the programmable processor and the executable control software determines that the child device data indicates the alarm condition.

9. An ambient condition detection system comprising:
a control panel;
a gateway in wired communication with the control panel;
a parent device in wireless communication with the gateway, wherein the parent device includes a siren device that emits a siren, a strobe device that emits a strobe light, or an electromagnet that closes or opens a fire door; and
a child device in wireless communication with the parent device,
wherein the child device wirelessly transmits child data to the parent device, wherein the parent device wirelessly transmits the child data to the gateway,
wherein the parent device appends parent device data to the child data from the child device,
wherein the parent device wirelessly transmits a packet to the gateway when the parent device receives the child data from the child device, wherein the packet includes the parent data appended to the child data,
wherein, when the parent device wirelessly receives the child data from the child device, the parent device determines whether the child data indicates an alarm condition,
wherein, when the child data indicates the alarm condition, the parent device activates the siren device, the strobe device, or the electromagnet without waiting for a command from the control panel,
wherein the parent device activates the siren device, the strobe device, or the electromagnet substantially simultaneously with the parent device wirelessly transmitting the child data to the gateway, and
wherein the parent device, the child device, and the control panel are distinct devices.

10. The ambient condition detection system of claim 9 wherein, responsive to transmitting the packet, the parent device wirelessly receives instructions from the control panel via a gateway.

11. The ambient condition detection system of claim 9 wherein the parent device activates the siren device, the strobe device, or the electromagnet prior to wirelessly receiving the instructions from the control panel via the gateway.

12. The ambient condition detection system of claim 9 wherein the parent device activates the siren device, the strobe device, or the electromagnet substantially immediately after the parent device wirelessly receives the child data and determines that the child data indicates the alarm condition.

13. The ambient condition detection system of claim 9 wherein the parent device is a parent of the child device.

* * * * *